Figure 1:
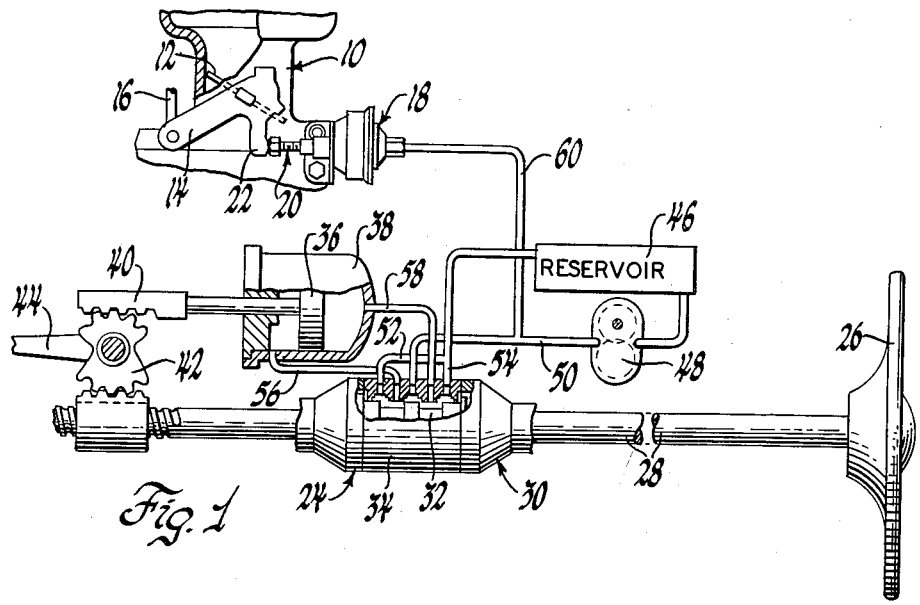

Feb. 27, 1962  A. F. BRAUN  3,022,849

THROTTLE ACTUATOR

Filed June 22, 1960

INVENTOR.
Adolph F. Braun
BY
R. P. Bernard
ATTORNEY

United States Patent Office 3,022,849
Patented Feb. 27, 1962

3,022,849
THROTTLE ACTUATOR
Adolph F. Braun, Pittsford, N.Y., assignor to General Motors Corporation, Detroit, Mich., a corporation of Delaware
Filed June 22, 1960, Ser. No. 37,886
1 Claim. (Cl. 180—77)

The present invention relates to a mechanism associated with a power steering device which will occasion an opening of a carburetor throttle from its normal idling position when the power steering device is operative to prevent engine stalling.

In endeavoring to park vehicles having power steering mechanisms, it is common for the operator to remove his foot completely from the accelerator pedal and rely on the engine idling speed to provide the small amount of motion necessary to park the vehicle. However, the power steering mechanism itself imposes an additional load on the engine which, unless the throttle is open slightly to compensate for this added load, will frequently result in engine stalling.

An undesirable alternative to such stalling would be to set the engine idling speed sufficiently high to idle under all conditions at a speed sufficient to compensate for power steering loads. This alternative, however, would result in inordinately high engine idling speed under conditions when the power steering was not operative and would itself create other problems such as creeping in a car equipped with an automatic transmission.

To overcome these difficulties the present invention is directed to a mechanism which is responsive to an operative power steering device for opening the carburetor throttle a predetermined amount to offset the additional power steering load imposed on the engine.

In the present invention a servo mechanism is operatively associated with the carburetor throttle in such a way that a portion of the fluid used in the power steering system is diverted to the servo and when the fluid pressure reaches a value indicative of power steering it will enable the servo to move the throttle to a more opened idle position.

Utilizing a servo actuated by power steering fluid pressures as a means for controlling opening movement of a throttle presents certain difficulties in that the steering pressures involved are frequently considerable for which reason it is necessary to utilize a servo mechanism that, while permitting these pressures to open the throttle from its normal idle position, may itself withstand such high pressures without being damaged. Accordingly, in the present invention a servo is utilized which embodies a flexible diaphragm backed up by a rigid plate limiting the amount of movement of the diaphragm and transferring the steering pressures thereto after the desired diaphragm movement has taken place.

The details as well as other objects and advantages of the present invention will be apparent from a perusal of the detailed description which follows.

Figure 2:
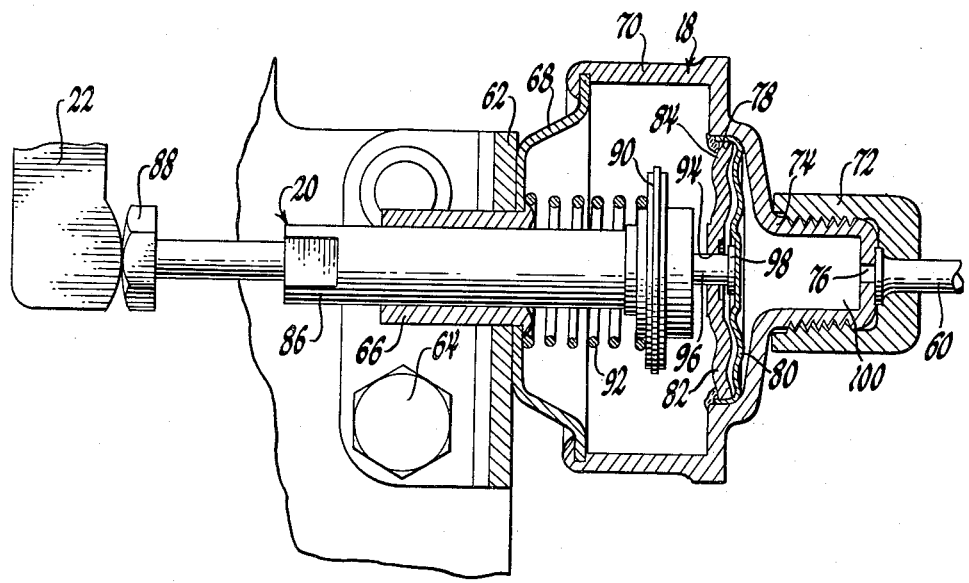

In the drawings:

FIGURE 1 is a diagrammatic representation of the present invention as combined with a carburetor throttle and a power steering mechanism; and FIGURE 2 is an enlarged sectional view of the throttle actuating servo mechanism.

Referring first to FIGURE 1, a carburetor is shown generally at 10 and includes a throttle valve 12 having an exteriorly disposed throttle lever 14 to which a link or rod 16 is suitably articulated for normal throttle actuation by any suitable means such as an accelerator pedal, not shown. A servo mechanism is shown generally at 18 and includes an adjustable stud means 20 adapted to engage an arm 22 on throttle lever 14 to modify the movement of throttle valve 12.

An illustrative power steering system is indicated generally at 24 and includes a steering wheel 26 having a shaft 28 fixed for rotation therewith. Inasmuch as the power steering system shown in the drawing is intended to represent any one of the various specific systems which may be used and is well known to the art, the system will be described only to the extent necessary to an understanding of the present invention. A steering valve mechanism is shown at 30 and includes a spool valve member 32 axially movable relative to a ported casing 34 to selectively supply fluid under pressure to the different sides of piston 36 in a steering servo device 38. Piston 36 connects through a rack 40 and segmental gear 42 permitting the vehicle wheels to be steered through the rotation of an arm 44 fixed to the gear.

Fluid under pressure is supplied from a reservoir 46 and a pump 48 to a passage 50 which in turn leads to ported casing 34. With the power steering mechanism neutralized or inoperative, as shown in FIGURE 1, fluid under pressure is supplied to casing 34 but is returned to reservoir 46 through passages 52 and 54 until such time as spool valve 32 is moved axially to block one of the ports leading to exhaust passage 52 or 54 and, at the same time, admitting fluid to either of the servo passage 56 or 58 to occasion a steering of the vehicle wheels. A branch passage 60 leads from pump output passage 50 to servo 18 for purposes now to be considered in greater detail.

Referring now to FIGURE 2, it will be seen that servo device 18 includes a bracket 62 suitably fixed to the carburetor body through stud members 64 such that the axially adjustable stud means 20 may be disposed proximate arm 22 of throttle lever 14. Device 18 includes a sleeve member 66 adapted to slidably receive stud means 20 and in turn is fixed to bracket 62. A first casing member 68 is fixed to sleeve 66 and in turn supports a second enlarged casing portion 70. A suitable fitting or coupling member 72 is threadably mounted on an axially extended portion 74 of casing 70 so as to secure one end of passage 60 to servo device 18. An opening 76 is formed in the end of casing portion 74 to admit steering fluid pressure within casing 70.

Casing 74 is recessed to provide an annular mounting surface 78 for a diaphragm device which includes a flexible diaphragm member 80 and a rigid backing plate member 82. The subassembly of diaphragm and backing plate is suitably fixed within casing 74 in any suitable manner such as by the weld indicated at 84. Axially adjustable stud means 20 actually includes a large member 86 which is internally threaded at one end to permit adjustment of throttle arm engaging stud element 88 in order to establish the basic axial relationship between device 18 and throttle 22.

The end portion of stud member 86 disposed within casings 68 and 70 includes an enlarged portion providing a seat 90 for a spring element 92 the other end of which seats against casing 68. Diaphragm backing plate 82 is centrally apertured at 94 and is adapted to slidably receive a pin element 96. Pin 96 includes a head 98 adapted to centrally engage diaphragm 80. The other end of pin 96 abuttingly engages stud member 86 such that when fluid under suitable pressure is admitted to the chamber 100 defined by diaphragm 80 and casing 70, the diaphragm is adapted to move leftwardly and in turn similarly moves stud means 20 to cause a slight opening movement of throttle valve 12 thereby maintaining normal engine idling speed.

Spring 92 biases the stud means 20 against the diaphragm 80, through pin 96, with sufficient force that the fluid pressure within conduit 60 and chamber 100 is insufficient when the power steering mechanism is bypassing fluid back to the reservoir to occasion any actuation of the servo 18. On the other hand, when power steering spool valve 32 is shifted to operate steering servo 38, the pressure in conduit 60 and chamber 100 increases sufficiently to overcome spring 92 causing servo 18 to open throttle 12 as noted.

Since fluid steering pressures reach a considerable magnitude, backing plate 82 is adapted to limit the extent of diaphragm deflection to that amount necessary to achieve a suitable engine idling speed to prevent stalling and thereafter to absorb and resist the power steering pressures which will obtain in chamber 100. It will be seen that in this way the diaphragm 80 is not unduly stressed.

I claim:

A vehicle including an engine idling speed controlling device comprising a carburetor having a throttle valve, a servo mechanism adapted to operatively engage said throttle valve to move the same in an opening direction beyond its normal idle position, a power steering mechanism, said power steering mechanism including a source of fluid under pressure, conduit means communicating said fluid pressure source with said servo, said servo including casing means, a diaphragm mounted in said casing means and exposed on one side to the fluid pressure in said conduit means, a backing plate concentrically mounted in said casing means on the other side of and proximate to the diaphragm, said plate limiting axial movement of said diaphragm under influence of fluid pressure, a pin axially movable within a central aperture in the backing plate, one end of the pin being engageable with the diaphragm, a stud element slidably mounted in the casing means, a spring urging the stud element into engagement with the pin, and means to increase said fluid pressure to actuate said servo mechanism and move the throttle valve to a more open idling position when said power steering mechanism is operative to create a steering force.

References Cited in the file of this patent

UNITED STATES PATENTS

| | | |
|---|---|---|
| 1,925,000 | Mullins | Aug. 29, 1933 |
| 2,313,704 | Hey | Mar. 9, 1943 |